Figure 1:
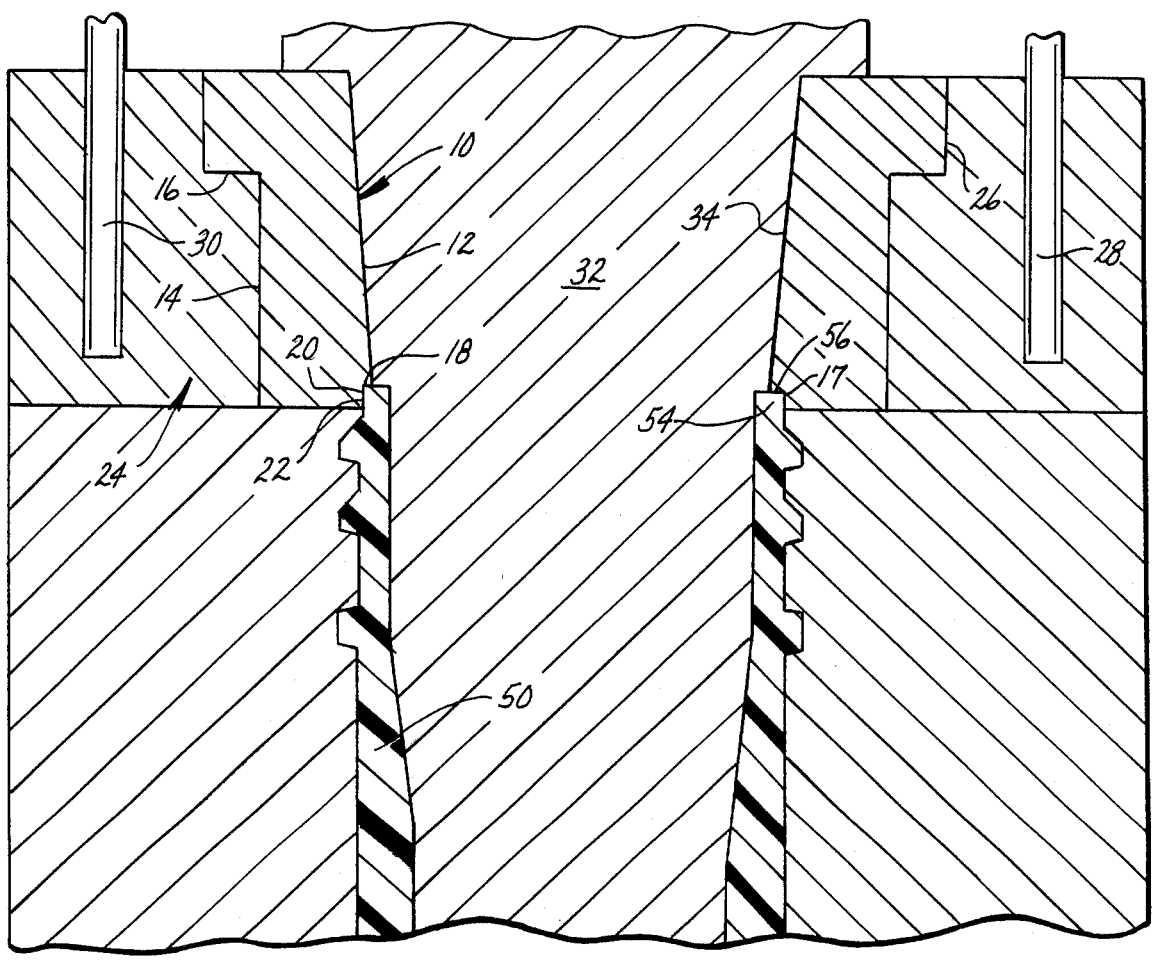
Figure 1:
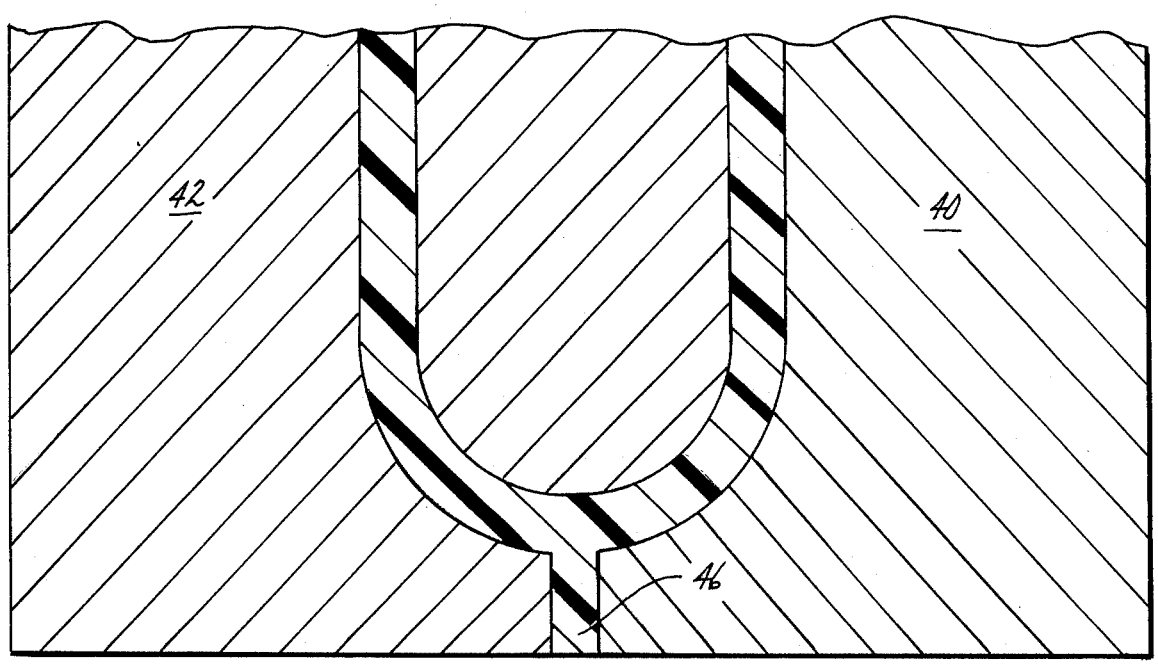

United States Patent [19]

Dundas et al.

[11] Patent Number: 4,575,331

[45] Date of Patent: Mar. 11, 1986

[54] TRANSPORT NECK RING

[75] Inventors: Dennis L. Dundas, Lee's Summit; William H. Myers, Raytown; William G. Kinslow, Jr., Gladstone, all of Mo.

[73] Assignee: Hoover Universal, Inc., Ann Arbor, Mich.

[21] Appl. No.: 546,680

[22] Filed: Oct. 28, 1983

Related U.S. Application Data

[63] Continuation of Ser. No. 358,137, Mar. 15, 1982, abandoned.

[51] Int. Cl.[4] .................. B29C 45/04; B29C 49/06
[52] U.S. Cl. ..................... 425/577; 249/144; 264/537; 425/525; 425/533; 425/534
[58] Field of Search .............. 425/525, 533, 534, 577; 249/144, 151; 264/537, 538

[56] References Cited

U.S. PATENT DOCUMENTS

| | | | |
|---|---|---|---|
| 3,471,896 | 10/1969 | Ninneman | 425/533 X |
| 3,543,340 | 12/1970 | Guelph | 425/533 X |
| 3,944,643 | 3/1976 | Sato et al. | 425/533 X |
| 3,969,058 | 7/1976 | Procter | 425/533 X |
| 4,201,360 | 5/1980 | Schwartzburg et al. | 249/144 X |

Primary Examiner—Jan Silbaugh
Attorney, Agent, or Firm—Stephenson and Boller

[57] ABSTRACT

A carrier ring for achieving attachment to the thermoplastic perform as the preform is formed in a split injection mold is disclosed. The split injection mold defines a mold cavity into which a core pin is positionable. The mold cavity, along with the position core pin, defines the principle portion of the preform cavity. The remainder of the preform cavity is provided by an annular groove in the carrier ring. This annular groove has a substantially horizontal outwardly extending first wall, a substantially horizontal inwardly extending second wall downwardly displaced from the first wall, and a downwardly and inwardly extending third wall emanating from the outwardmost extent of the first wall and terminating at the inward most extent of the second wall.

1 Claim, 2 Drawing Figures

TRANSPORT NECK RING

CROSS REFERENCE TO RELATED APPLICATION

This application is a continuation of application Ser. No. 358,137, filed Mar. 15, 1982 now abandoned.

In the formation of thermoplastic containers it is oftentimes advantageous to form the containers using a multiple step process and apparatus. In U.S. Pat. No. 2,331,702; U.S. Pat. No. 3,172,929; U.S. Pat. No. 3,412,188; U.S. Pat. No. 3,850,562 and U.S. Pat. No. 4,151,247 two principle steps are used, i.e. a preform is made by injection molding and the injection molded preform is blow-molded to yield the final product. Some of the processes and apparatuses described in these patents utilize additional temperature conditioning steps between the injection molding step and the blow-molding step.

A different type of process and apparatus is described in U.S. Pat. No. 4,004,872. This patent teaches that containers can be formed by the utilization of a three step process, i.e. extrusion of a parison, pre-blowing of the parison to a shape similar to but smaller than the desired final shape and blowing the pre-blown parison to the final shape. Additional steps may be utilized between the pre-blow and the final-blow steps.

Irrespective of the type of multistage process used it is necessary to transport the injection formed preform or the pre-blown parison from its formation station to the blow molding station and to all other ancillary stations therebetween. As can be seen from the above mentioned patents it is well known to effect such transport by attaching the preform or pre-blown parison at a point adjacent its neck to a powered apparatus which moves the attached preform or pre-blown parison from station to station.

Special concern about the attaching systems used by multi-step apparatuses has been raised by the carbonated beverage industry whose use of thermoplastic containers has soared to hundreds of millions of containers per year. This industry needs a container with a neck which has an interior wall adjacent the neck which is as smooth as possible and which has an undistorted well-defined neck thread. A smooth interior neck wall is desirable to accommodate the high speed fill lines used today while a high quality thread is needed to insure high fidelity in fitment of a closure to the threaded container neck.

Therefore, it is an object of this invention to provide a neck ring, associated with a transport mechanism, for achieving attachment of a parison or pre-blow preform without affecting neck thread quality and the smoothness of the interior neck wall.

THE INVENTION

This invention relates to a unique carrier ring for achieving attachment to a thermoplastic preform as the preform is formed in a split injection mold. The carrier ring is in association with a powered transport system for the movement of the carrier ring and its attached preform to and from the various stations found on multi-station container forming apparatuses. The carrier ring is positioned adjacent the split injection mold during the injection formation of the preform. The split injection mold defines an injection mold cavity into which a core pin is positionable to define the principal portion of a preform cavity. The carrier ring is annular in shape and has a bore dimension for passage and seating of the core pin. The carrier ring has, at its inner lowermost extent, an annular groove which defines the remaining portion of the preform cavity. The annular groove is utilized for obtaining the beforementioned attachment between the carrier ring and the preform. The annular groove is characterized in that it has a substantially horizontal outwardly extending first wall which defines a portion of the upper surface of the preform cavity. In addition to this first wall there is provided a substantially horizontal inwardly extending second wall which is downwardly displaced from the first wall. Connecting the first wall to the second wall is a downwardly and inwardly extending third wall which emanates from the outward most extent of the first wall and terminates at the inward most extent of the second wall. By utilizing such a configured annular groove and by having the annular groove define a portion of the preform cavity, the attachment between the preform and the carrier ring is effected. This attachment can best be described as an interference fit between the ring and the preform as the second wall is in an undercut relationship with the preform. This relationship provides sturdy enough attachment between the ring and the preform so that the preform can be successfully moved from station to station and undergo the various stations operations without loss of the attachment between the ring and the preform. Another quality of the attachment achieved by the specially designed annular groove is that while, being sturdy enough to effect the attaching function, it must still allow for removal of the blown preform from the carrier ring. Generally speaking, this removal is easily accomplished by stripping the blown preform from the carrier ring. Therefore the annular groove utilized by the carrier ring of this invention has to allow for release of the attachment under stripping forces which are commonly used on multi-station injection-blow molding apparatus.

Figure 2:
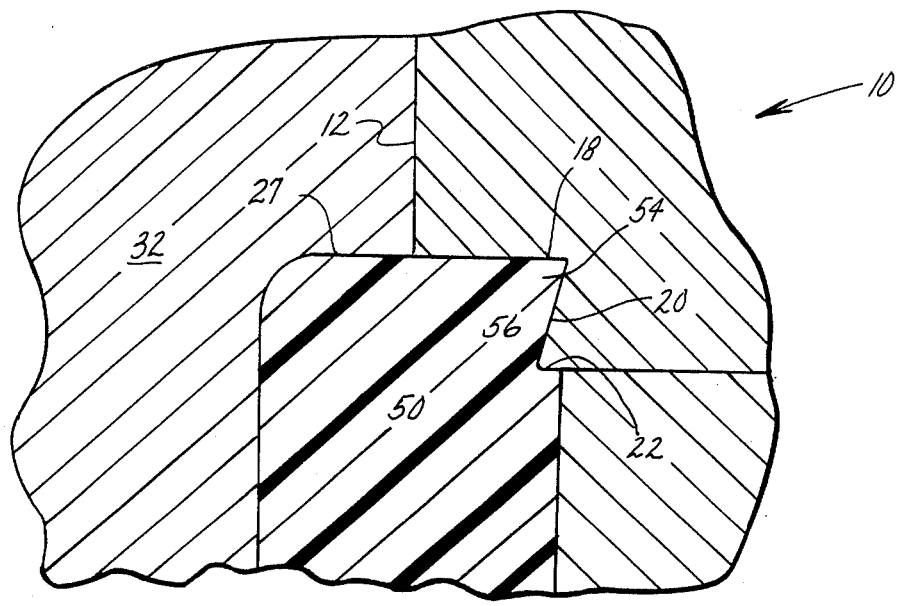

These and other features of this invention contributing to satisfaction in use and economy of manufacture will be more fully understood from the following description of a preferred embodiment and the accompanying drawings in which identical numerals refer to identical parts and in which:

FIG. 1 is a sectional view taken through a split injection mold showing a carrier ring of this invention and a core pin in their position during injection forming of a preform; and FIG. 2 is an enlarged view of the upper righthand corner of the preform as shown in FIG. 1.

Referring now to FIGS. 1-2 there can be seen a carrier ring of this invention generally designated by the numeral 10 as it would be used in association with a split injection mold, generally designated by the numeral 39 and a core pin, generally designated by the numeral 32. The split injection mold 39 is comprised of two mold halves designated by the numerals 40 and 42 in FIG. 1. An injection nozzle fits into injection nozzle cavity 46 provided by mold halves 40 and 42. Core pin 32 is positionable within the mold cavity so that it and the mold cavity define the principal part of the preform cavity.

Positioned at the uppermost extent of split injection mold 39 is carrier ring 10. Carrier ring 10 has a tapered bore defined by inside wall 12 which allows for passage of core pin 32 and which effects aligned seating of the core pin 32 when it is in its lowered position within the injection mold cavity. (Core pin 32 has a similar tapered portion 34 for cooperation with inside wall 12 to achieve the aligned seating).

Carrier ring 10 nests within annular collar 24. Annular collar 24 is attached to a power transport mechanism by way of connecting rods 28 and 30. Carrier ring 10 has a circular outside surface 14 having a diameter snuggly fitable within the bore of annular collar 24. To aid in the nesting relationship between annular collar 24 and carrier ring 10 there is provided annular collar recess 26 in annular collar 24. Fitable within this annular recess is an carrier ring flange 16.

As mentioned previously and as can be seen in FIG. 1, core pin 32 and the injection mold cavity defined by injection mold halves 40 and 42, almost completely define the injection mold cavity. The only portion of the injection mold cavity not defined by the core pin and the mold halves is located at the uppermost portion of the injection mold cavity. Here it can be seen that carrier 10 at its lower-innermost extent has annular groove 17 which is defined by outwardly extending wall 18, inwardly extending wall 22 and inwardly and downwardly extending wall 20. Preferably outwardly extending wall 18 has a length within the range of about 0.020 inches to about 0.100 inches and the inwardly extending wall 22 has a length within the range from about 0.005 inches to about 0.030 inches. The angle which inwardly and downwardly extending wall 20 makes with a plane perpendicular to the center axis of the carrier ring is within the range of from about 50 to about 80 degrees. From both the figures it can be easily appreciated how carrier ring 10 achieves the interference fit with injection molded preform 50. As can be seen inwardly extending wall 22 and downward and inwardly extending wall 20 provide for an interference fit due to the undercut position of the intersection of these two walls. It is also noted that outwardly extending wall 18 forms a portion 56 of the uppermost surface of preform 50 thereby assuring that preform 50 at its uppermost outside extent 54 will extend outwardly of the intersection between walls 20 and 22. The remaining portion 27 of the uppermost surface of preform 50 is formed by an annular lip on core pin 32.

From the above description, it will be readily understood by those skilled in the art that the carrier ring 10 depends from the annular collar 24 which is connected to the power transport mechanism through the connecting rods 28 and 30, whereby the transport mechanism is operable to support the carrier ring 10 and attached preform 50 from the area of the split injection molds 40, 42 after the core pin 32 has been removed from the injection mold cavity and the split injection molds 40, 42 are opened. By this construction and arrangement, the preform 50 is suspended solely from the carrier ring 10 for movement to and from various stations in multi-station forming apparatuses.

We claim:

1. A carrier ring and split injection mold assembly including a core pin and a powered transport system wherein the carrier ring is supported by an annular collar attached to the powered transport mechanism, said mechanism being operable to support the carrier ring and a preform suspended therefrom for movement to and from various stations in multi-station forming apparatuses after the split injection mold assembly including the core pin have been removed, said assembly comprising a pair of mold halves which cooperate to define an injection mold cavity having an open upper end, a carrier ring of annular shape positioned at said upper end of said mold cavity and having an outwardly tapered inside wall aligned with the open end of said cavity, a core pin having a tapered surface and insertable into said mold cavity to a position in which said tapered surface seats on said tapered ring wall and said core cooperates with said mold halves to form a mold cavity corresponding in shape to a lower portion of the desired shape of a hollow preform to be molded in said mold assembly, said carrier ring being structured to provide for an interference fit between the carrier ring and the preform so that when the preform is removed from the mold it is supported by said carrier ring, said carrier ring for this purpose having at its inner lowermost extent an annular groove which defines an upper portion of said preform cavity, said annular groove having:

(a) a substantially horizontal first wall extending radially outwardly in a direction away from said core pin and terminating at a location spaced radially outwardly from said core pin, said first wall defining a portion of the upper surface of said preform cavity;

(b) a substantially horizontal second wall downwardly displaced from said first wall extending radially inwardly in a direction toward said core pin and terminating at a location spaced radially outwardly from said core pin; and (c) a downwardly and inwardly extending third wall emanating from the outward most extent of said first wall and terminating at the inward most extent of said second wall, said core pin being upwardly removable from said injection mold and said mold halves being movable away from said preform so as to leave said preform suspended solely from said carrier ring with the interior surface of the preform accessible from above through the open center of said carrier ring.

* * * * *